(12) United States Patent
Miller

(10) Patent No.: US 6,813,057 B2
(45) Date of Patent: Nov. 2, 2004

(54) CONFIGURATIONS FOR AN OPTICAL CROSSCONNECT SWITCH

(75) Inventor: Samuel Miller, Albuquerque, NM (US)

(73) Assignee: Memx, Inc., Albuquerque, NM (US)

(*) Notice: Subject to any disclaimer, the term of this patent is extended or adjusted under 35 U.S.C. 154(b) by 236 days.

(21) Appl. No.: 09/968,412

(22) Filed: Sep. 27, 2001

(65) Prior Publication Data

US 2004/0169909 A1 Sep. 2, 2004

(51) Int. Cl.[7] .................. G02B 26/00; G02B 26/08; G02B 6/26
(52) U.S. Cl. .................. 359/290; 359/291; 359/298; 385/16; 385/18; 385/19
(58) Field of Search .................. 359/290, 291, 359/214, 224, 237, 247, 320, 298; 385/14, 15, 16, 17, 18, 22, 25, 31, 33; 310/36, 37; 348/770, 771, 742

(56) References Cited

U.S. PATENT DOCUMENTS

| | | | |
|---|---|---|---|
| 5,766,367 A | 6/1998 | Smith et al. | 134/2 |
| 5,783,340 A | 7/1998 | Farino et al. | 430/22 |
| 5,798,283 A | 8/1998 | Montague et al. | 438/24 |
| 5,804,084 A | 9/1998 | Nasby et al. | 216/2 |
| 5,808,780 A | 9/1998 | McDonald | 359/290 |
| 5,867,302 A | 2/1999 | Fleming | 359/281 |
| 5,919,548 A | 7/1999 | Barron et al. | 428/138 |
| 5,955,801 A | 9/1999 | Romero et al. | 310/40 |
| 5,959,376 A | 9/1999 | Allen | 310/40 |
| 5,963,788 A | 10/1999 | Barron et al. | 438/48 |
| 5,990,473 A | 11/1999 | Dickey et al. | 250/231.13 |
| 5,994,801 A | 11/1999 | Garcia | 310/40 |
| 6,012,336 A | 1/2000 | Eaton et al. | 73/754 |
| 6,020,272 A | 2/2000 | Fleming | 438/734 |
| 6,044,705 A | 4/2000 | Neukermans et al. | 73/504.02 |
| 6,064,506 A * | 5/2000 | Koops | 359/237 |
| 6,327,398 B1 | 12/2001 | Solgaard et al. | 385/18 |
| 6,466,711 B1 | 10/2002 | Laor et al. | 385/18 |
| 6,539,142 B2 * | 3/2003 | Lemoff et al. | 385/18 |
| 6,549,692 B1 * | 4/2003 | Harel et al. | 385/18 |
| 6,560,384 B1 * | 5/2003 | Helkey et al. | 385/18 |
| 6,567,574 B1 * | 5/2003 | Ma et al. | 385/16 |
| 6,603,894 B1 * | 8/2003 | Pu | 385/18 |

FOREIGN PATENT DOCUMENTS

| | | | |
|---|---|---|---|
| JP | 2617054 | 10/1991 | |
| WO | WO 98/44571 | 10/1998 | H01L/41/08 |
| WO | WO 00/13210 | 3/2000 | |

* cited by examiner

Primary Examiner—Loha Ben
(74) Attorney, Agent, or Firm—Marsh Fischmann & Breyfogle LLP

(57) ABSTRACT

The invention is directed to improved optical crossconnnect switch configurations and implementations. In one embodiment, a beam directing unit (600) includes an input port array (601), input fixed mirrors (604), an input movable mirror array (606), an output movable mirror array (608), output fixed mirrors (610) and an output port array (611). The pitch of the input mirror array (606) is one-half the pitch of the input port array (601) and the pitch of the output mirror array (601) and the pitch of the output mirror array (608) is one-half the pitch of the output port array (611). In addition, in a reference orientation, each of the mirrors of array (606) directs beams to a common centerpoint of output array (608), and each of the mirrors (608) directs beams to a common centerpoint of array (606).

60 Claims, 9 Drawing Sheets

CONFIGURATIONS FOR AN OPTICAL CROSSCONNECT SWITCH

FIELD OF THE INVENTION

The present invention relates in general to optical crossconnect (OXC) switches and, in particular, to OXC switch configurations that improve switch design and operation as well as enhancing optical performance.

BACKGROUND OF THE INVENTION

Mode networks for communicating voice, video and/or data ("communication networks") typically include an optical portion and an electrical portion. In the optical portion, information is modulated in an optical signal that is transmitted through optical fibers. In the electrical portion of the network, information is transmitted in the form of an electrical signal via wires. Optical transmission has a number of advantages over electrical transmission, notably, enhanced bandwidth capacity. However, electrical transmission has certain advantages including the widespread availability of electrical network structure and well developed data routing components and protocols. For these reasons, optical fibers are coming to predominate at the network core while wire circuitry remains the standard at the network periphery.

Even within the optical portion of the network, switching is often performed by optical- electrical-optical (OEO) switches. In such switches, the incoming optical signal is converted into an electrical signal, switching is performed in the electrical domain, and the outgoing signal is converted back into the optical domain. OEO switches allow for use of well developed electrical switch technology within the optical portion of the network. However, OEO switches are increasingly becoming the bandwidth bottlenecks of modem communication networks. In addition, such switches generally entail reading routing information from packet headers and the like, and are therefore protocol dependent.

Significant effort has therefore been directed to developing OXC switches for various core and peripheral network applications. OXC switches perform at least some switching functionality by directing optical signals in the form of beams between input and output ports, e.g., fibers or other optical or electro-optical components, without converting the signals into another domain. It will be appreciated that such connections typically support bidirectional communication and the terms "input" and "output" are therefore used herein for convenience and not by way of limitation. Such switches can therefore be substantially transparent to the transmitted signals, thereby enhancing bandwidth capabilities and avoiding compatibility issues in connection with new or varying network communication protocols.

Various types of OXC switches have been proposed including fiber translation switches, fiber bending switches and the mirror based switches. In fiber translation switches, one or both of the input and output fibers or fiber bundles are moved or translated in one or more dimensions to align a selected input fiber with a selected output fiber. However, such switches require movement of bulk components and generally are too slow for practical applications in modem communications networks. Moreover, such switches may not allow for multiple, simultaneous and independent connections as between fibers of the moved bundles.

In fiber bending switches, the end of an input and/or an output fiber is bent, e.g., using piezoelectric elements, to optically connect the fibers for transmission of optical beams therebetween. Again, such switches have not gained widespread acceptance for modem communication network applications requiring large-scale switches, fast response times and low insertion losses.

Mirror based switches utilize movable mirrors to redirect optical signals so as to connect a selected input fiber to a selected output fiber. Early designs used a bulk mirror or mirrors with bulk mechanical elements for moving the mirror(s). In cases where one movable mirror interfaces multiple input fibers with multiple output fibers, such switches may not support multiple simultaneous and independent connections. In any event, bulk mirrors generally involve response times that are impractical for modem communication network applications and/or are too large to be inserted into existing racks or other network structures or otherwise have too large a physical footprint to appeal to network providers.

More recently, numerous developers have proposed micro-mirror switches. Typically, these switches are proposed to be implemented using Micro-Electro-Mechanical System (MEMS) technology wherein the mirrors, actuators for moving the mirrors and associated integrated circuitry are fabricated on substrates using semi-conductor fabrication techniques. Micro-mirror switches are promising because it is believed that they will provide acceptable response times, because the mirrors can be mapped to individual fibers to allow for substantially unlimited simultaneous and independent connections (subject to the switch size, e.g., 256×256), and because practical switches can be dimensioned to appeal to network providers.

However, significant challenges remain with respect to realizing the potential benefits of micro-mirror OXC switches. First, some MEMS designs provide a substantially limited range of angular motion of micro-mirrors, e.g., before the mirrors "bottom out" on the substrate. Thus, in order to make large-scale switches, for example, 256×256 or greater switches, long switch interface path lengths may be required. Long path lengths, in turn, may require a large switch footprint and/or complicated optical folding, may complicate alignment and may entail a risk of cross talk due to beam spreading. Also, accurately controlling the actuators to form any of the possible connections in a large-scale switch is problematic, especially because each mirror typically has a unique switching geometry in conventional designs.

Another practical difficulty is that substantial expense is involved in designing and fabricating MEMS mirror arrays. Because the area or pitch of the mirror array is generally matched to the pitch of the associated fiber array in conventional switch designs, retooling or redesign of the fabrication process may be necessary for each switch geometry. The same limitation may affect the switch footprint.

SUMMARY OF THE INVENTION

The present invention relates to improved OXC switch configurations and implementations that address a number of needs as discussed above. In this regard, the invention provides paired movable mirror switch configurations where mirrors in a first array have a common reference orientation relative to a second array and require substantially the same range of angular movement to target the mirrors of the second array thereby simplifying switching control. Additionally, the invention provides configurations for de-coupling the mirror array pitch from the associated fiber array pitch, thereby providing significant flexibility in switch design and implementation. The invention also provides a number of switch geometries for improved optical efficiency.

In accordance with one aspect of the present invention, a number of mirrors of an optical crossconnect switch have a common relative reference orientation with respect to an array of targets such as additional mirrors or ports. In one embodiment, the switch includes two arrays of movable mirrors where any of multiple input ports can be connected to any of multiple output ports via reflection by a mirror of the first array and a mirror of the second array (addition mirrors may be involved in establishing a connection as will be discussed below). In accordance with the present invention, each of a number of mirrors of the first array is configured so as to direct an incident beam to substantially the same location relative to the second array. For example, each of the mirrors of the first array, under a nominal or reference condition, may direct an incident beam from an associated input port to a center point or center mirror of the second array. Thus, the geometry of the first mirrors, or the electrostatic force of the associated actuator components, may be varied from mirror-to-mirror such that the same common mode voltage sets the initial relative tilt angle to properly direct the beam relative to the second array.

It will be appreciated that such an initial relative tilt angle will depend on various geometric factors including the position of the subject mirror in the first array and the incoming beam angle which may be different for different mirrors (i.e., the incoming beams directed from the input ports to the mirrors of the first array may not be parallel). By configuring the mirrors of the first array to have the same relative reference orientation, a larger number of crossconnects (for a given mirror spacing) can be achieved for a given range of active mirror motion. Also, each of the first mirrors of the first array may require substantially the same range of angular motion to address all of the second mirrors of the second array. Moreover, the switch may thereby be readily implemented such that the same control signal applied to any first mirror will establish a connection via the same second mirror, thereby simplifying control.

According to another aspect of the present invention, the pitch of an input or output port array is decoupled from the pitch of an array of movable mirrors. The associated switch includes an array of ports and an array of movable mirrors for directing optical beams relative to (to or from) the ports. The array of ports defines a cross-section port array area or "port pitch" with respect to a first plane adjacent to the port array and orthogonal to a first center axis of first beams transmitted relative to the port array. That is, the port pitch is the area of the ports as projected, relative to the first center axis, onto the first orthogonal plane. The array of mirrors defines a cross-sectional mirror array area or "mirror pitch" with respect to a second plane adjacent to the mirror array and orthogonal to a second center axis of beams transmitted relative to the mirror array, i.e., the mirror pitch is the area of the mirrors as projected relative to the second center axis onto the second orthogonal plane. It will be appreciated that the ports and/or the mirrors may have a three-dimensional rather than a co-planar configuration. In addition, some or all of the first beams and second beams may have orientations that are not parallel to the respective first and second axes.

In accordance with the present invention, the port pitch may differ from the mirror pitch. For example, the angular orientations of the ports may be varied or a pitch magnifying or demagnifying element (e.g. a mirror or mirrors) may be interposed between the port array and the mirror array to decouple the port pitch from the mirror pitch. Such a pitch translation mechanism allows incoming beams transmitted from the mirrors to the ports to be accepted by port fibers even though the mirrors may not be axially aligned with the fibers. In this manner, a given mirror array design can accommodate various port geometries. Moreover, the switch footprint may be reduced despite constraints as to the dimensions of the port array and/or mirror array. In this regard, it is anticipated that MEMS technology may allow for mirror pitches that are more compact than the port pitches of particular switch designs.

In accordance with a further aspect of the present invention, a fixed mirror is interposed between a mirror array and a port array. The associated switch includes: an array of first ports; an array of second ports; an array of first mirrors where each of the first mirrors is associated with a respective one of the first ports; and an array of second mirrors where each of the second mirrors is associated with a respective one of the second ports. In accordance with the present invention, the switch further includes at least one fixed mirror located either 1) between the first mirrors and first ports or 2) between the second mirrors and second ports. One or more fixed mirrors may be provided at both of the noted positions and the mirror(s) are preferably sufficient for optically interfacing multiple ones of, and up to all of, the first or second mirrors with the first or second ports, respectively. Such fixed mirrors can be used to decouple the port pitch from the associated mirror pitch and/or to amplify the effect of mirror movement and thereby reduce the required range of mirror motion for given mirror/port array dimensions.

According to a still further aspect of the present invention, the angular orientation of a mirror array support structure, such as a substrate in the case of a MEMS mirror array, is established so as to minimize the required tilt angle to effect all possible connections. The term "substrate" as used herein means those types of structures that can be handled by the types of equipment and processes that are used to fabricate micro-devices on, within, and/or from the substrate using one or more micro photolithographic patterns. The angle through which an incident signal is reflected by a mirror of an array is dependent on, inter alia, the tilt angle of the mirror relative to the support structure and the angular orientation of the support structure relative to the incoming path of the incident beam. It is desirable to reduce the tilt angle required for the most extreme connections. For example, in the case of connections formed by first and second arrays of movable mirrors, the most extreme connections may be those involving a mirror at one edge of the first array and the opposite edge of the second array and vice versa. Such extreme connections may determine the size of switch that can be achieved for a given mirror spacing, switch geometry and active mirror tilt angle.

In order to reduce the required tilt angle for such connections and potentially enhance the maximum switch size, a switch according to the present aspect of the invention has at least one mirror array formed on a substrate having a particular orientation. Specifically, the switch includes 1) an array of mirrors, tiltable relative to a support structure, for receiving incoming optical beams having a first axis, the mirror array having a first centerpoint, and 2) an array of targets having a second centerpoint, where each mirror of the mirror array can direct an incoming beam to any of the targets and the first and second centerpoints define a second axis. Depending on the switch design, the targets may be ports, mirrors or other optical components. The support structure is oriented such that a third axis, extending through the first centerpoint normal to an upper surface of the support structure, falls between the first and second axes and, preferably, substantially bisects the angle subtended by the first and second axes.

According to another aspect of the present invention, improved optical switch geometries are provided that incorporate one of reflectional symmetry and rotational symmetry. Reflectional symmetry refers to switch configurations where there is at least one axis of symmetry such that an optical pathway across a switch interface is symmetrical about the symmetry axis when projected onto a plane including the symmetry axis. Reflectional symmetry refers to switch configurations where there is at least one axis of symmetry such that an optical pathway across a switch interface is the same, as projected onto a plane orthogonal to the symmetry axis, when rotated 180° about the symmetry axis.

In one implementation, the first array is disposed on a first array support structure having a first centerpoint and the second array of mirrors is disposed on a second support structure having a second centerpoint. The first and second structures are oriented such that: 1) a first angle is defined between the line connecting the first and second centerpoints and a line normal to an upper surface of the first structure extending through the first centerpoint; 2) a second angle is defined between the line connecting the first and second centerpoints and the line normal to an upper surface of the second support structure extending through the second centerpoint; and 3) the first angle is substantially the same as the second angle. As will be understood from the description below, such geometry supports both rotational and reflectional symmetry implementations. Such geometries have advantages relating to optical efficiency. In particular, when a beam having a circular cross-section is reflected through an angle, the reflecting beam will have an elliptical cross-section. If the reflecting beam is then reflected a second time in a switch having a geometry as set forth above, the resulting beam will be restored to a circular or near circular cross-section with enhanced optical density and potentially reduced losses relative to insertion into an output fiber. The recognition of two separate symmetrical geometries for achieving such advantages provides improved options for optically efficient switch configurations.

BRIEF DESCRIPTION OF THE DRAWINGS

For a more complete understanding of the present invention, and further advantages thereof, referenced now made to the following detailed description taken in conjunction with the drawings in which.

DETAILED DESCRIPTION

In the following description, the invention is set forth with respect to various embodiments exemplifying various aspects of the invention. It will be appreciated that various aspects of the invention may be embodied and implemented in other ways. Accordingly, the following description should be understood as exemplifying certain embodiments and implementations of the present invention and should not be understood as limiting the scope of the invention.

Figure 1:
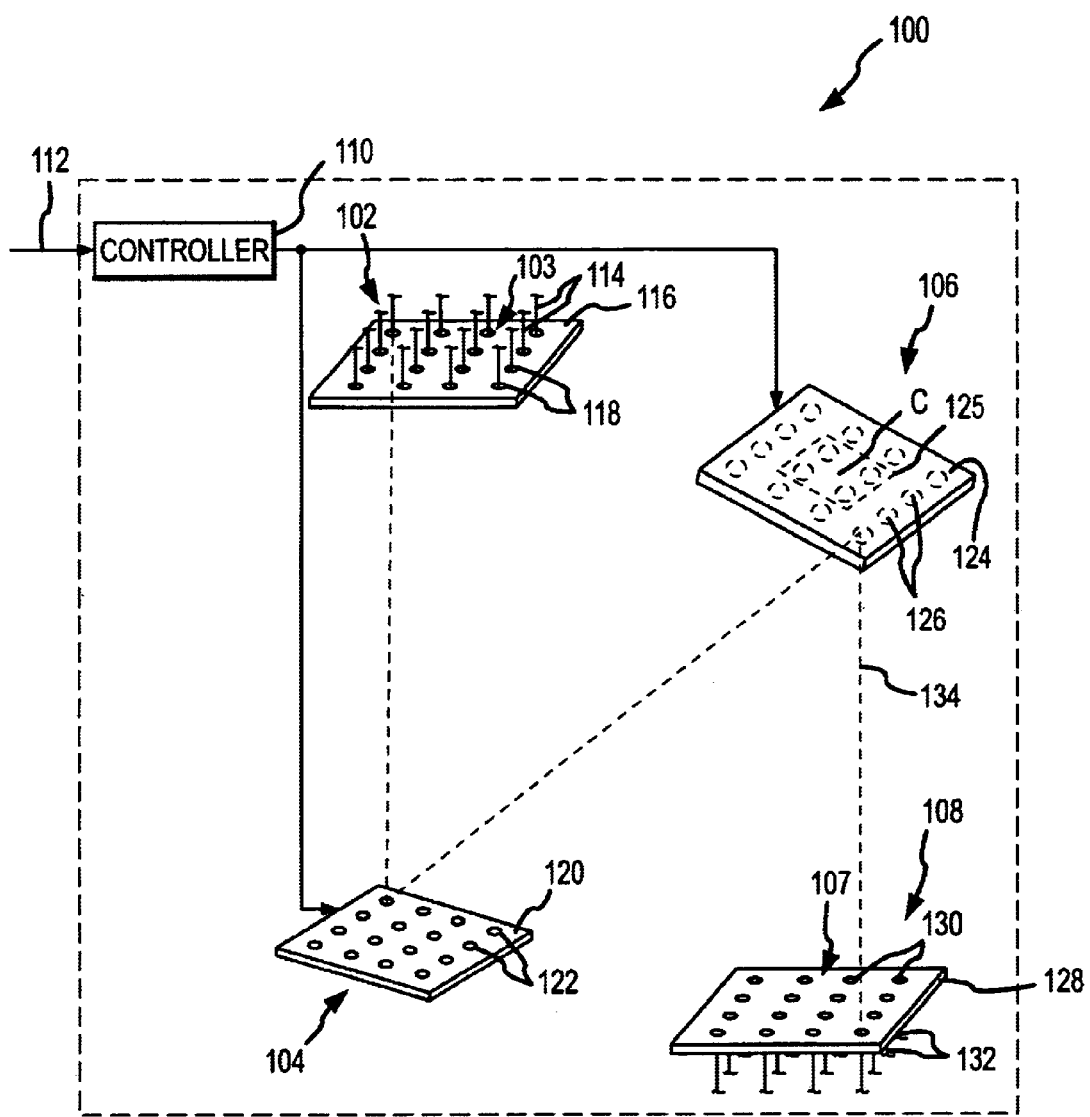
FIG. 1 is a schematic diagram of an optical crossconnect switch in accordance with the present invention.

Referring to FIG. 1, an optical crossconnect switch 100 in accordance with the present invention is shown. The switch 100 can have many different configurations as will be understood from the description below. FIG. 1 schematically illustrates various basic components of the optical switch 100 which will facilitate a more full understanding of the invention. The illustrated switch 100 includes a first port structure 102, a first mirror array structure 104, a second mirror array structure 106 and a second port structure 108. Optical signals may be bidirectionally transmitted between one of the first ports 103 of the first port structure 102 and one of the second ports 109 of the second port structure 108 via reflection by one of the first mirrors 122 of the first mirror array structure 120 and one of the second mirrors 126 of the second mirror array structure 106. Specifically, a signal transmitted from one of the first ports 103 (in this case, the "input port") is reflected by an associated first mirror 122 to a second mirror 126 that is associated-with the desired second port 109 (in this case the "output port"). Conversely, a signal transmitted from a second port 109 (in this case the "input port") is reflected by an associated second mirror 126 to a first mirror 122 associated with the desired first port 103 (in this case the "output port").

The illustrated switch 100 may be implemented as part of a communication network, e.g., for various network core or periphery applications. In this regard, it may be desired to occasionally and perhaps frequently reconfigure the network by changing the optical connections between any one or more of the first ports 103 and any one or more of the second ports 109. As will be described in detail below, such reconfiguring involves driving actuators resident on or otherwise associated with the first and second mirror array structures 104 and 106 to tilt certain mirrors 122 and 126 so as to form the desired connections. Appropriate signals to drive the actuators are provided via a switch controller 110,which may be resident at the switch 100 or at a remote location, in response to input signals 112 from a control system of the network administrator or operator. Although the switch controller 110 is schematically illustrated as a single component, it will be appreciated that individual controllers may be provided in connection with each mirror array structure 104 or 106 or portion thereof.

The ports on each side of the switch interface may be arranged in a linear array, planar array or other configuration. In the illustrated embodiment, the first port structure 102 supports a number of ports 103 that are arranged in a two-dimensional array. Each of the ports 103 is operative for transmitting and/or receiving optical signals. For example, in certain applications one set of ports may be embodied as fibers and associated optics for transmitting an optical signal and another set of ports may be embodied as a photo electric transducer or other detector. However, the ports 103 and 109 of the illustrated switch 100 transmit and receive signals optically. In this regard, each of the first ports 103 of the illustrated embodiment includes a fiber 114 bonded to or otherwise optically associated with optics 118 such as a lens for collimating, focusing or otherwise forming the optical signal exiting the fiber into a beam for transmission across the switch interface, generally indicated by optical pathway 134. It will be appreciated that it is desirable to minimize beam dispersion in order to allow for closer packing of the ports 103 and 109 and mirrors 122 and 126 without unacceptable crosstalk. The optics 118 are also operative for focusing incoming signals onto an end of the fiber 114.

The fibers 114 and optics 118 are mounted on a support structure, schematically illustrated as a plate 116 that maintains proper positioning and alignment of the fibers 114 and optics 118 relative to the first mirrors 122. In this regard, in order for an incoming optical beam to be transmitted into a fiber 114 the incidence angle of the incoming beam should be within the optical acceptance angle of the fiber. Thus, in the illustrated embodiment, it is desirable that each of the first mirrors122 is axially aligned with a corresponding one of the fibers 114. As will be understood from the description below, the optical pathway between a fiber 114 and a first mirror 122 may be folded. Accordingly, proper alignment and positioning of the fibers 114 and optics 118 relative to the first mirrors 122 is defined in relation to the optical pathway therebetween. The illustrated mirror array structure 120 includes a number of first mirrors 122 arranged in a two-dimensional array. It will be appreciated that one-dimensional arrays and three-dimensional arrays may alternatively be utilized in accordance with the present invention. The illustrated two-dimensional array provides certain advantages in relation to efficient fabrication and potentially reduced switch footprint. The first mirrors 122 are formed on a substrate 120 using a MEMS fabrication process as will be described below. In addition to the first mirrors 122, actuators, associated circuitry and other components may be formed on the substrate 120.

The second mirror array structure 106 includes a number of second mirrors 126 formed on a substrate 124. The second array structure 106 may, but need not, be substantially identical to the first mirror array structure 104. The illustrated array structure has a centerpoint C and a central area 125, both of which will be discussed below. Similarly, the second port structure 108 may, but need not, be substantially identical to the first port structure 102. The illustrated second port structure 108 includes a number of fibers 132 and associated optics 130 mounted on a support structure 128 (schematically illustrated as a plate).

The specific switch configuration will depend on a number of factors. Such factors may include the desired footprint of the switch, the specific switching application, the number of possible connections to be supported, e.g., 256×256, and the geometry of related components. Further, the switch 100 may include a number of components in addition to those shown. For example, the switch 100 may include optical multiplexing and demultiplexing components for managing multiple signal channels in a Dense Wavelength Division Multiplexed (DWDM) communications network.

Figure 2:
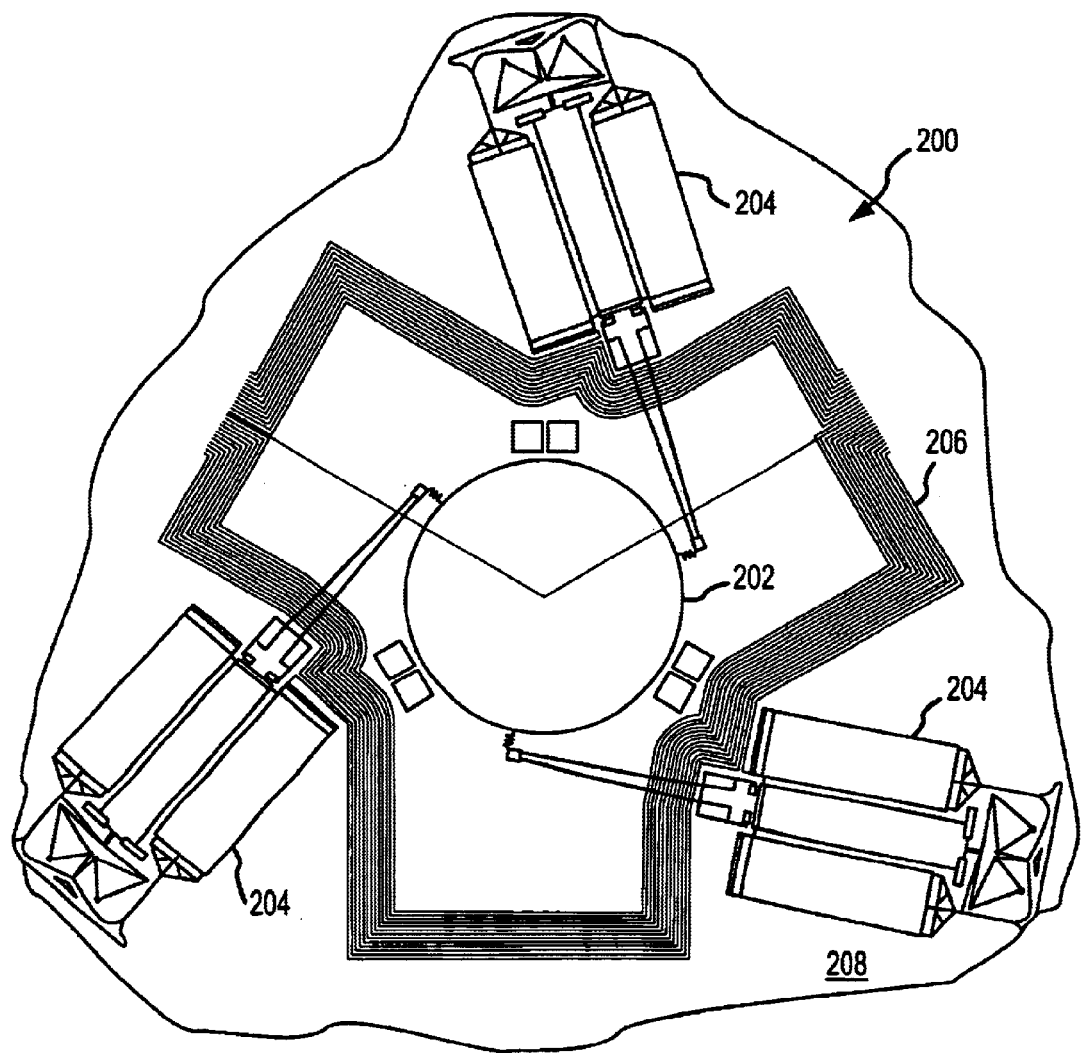
FIG. 2 is a top plan view of a movable mirror and associated actuators in accordance with the present invention.

FIG. 2 illustrates one mirror unit 200 of a mirror array in accordance with one possible implementation of the present invention. The illustrated components are described in more detail in United States Patent Application entitled "Large Tilt Angle MEM Platform," filed concurrently herewith which is incorporated herein by reference. The mirror unit 200 includes a mirror surface 202 that can be elevated (raised or lowered) and tilted to redirect an optical beam relative to a two-dimensional or three-dimensional array of targets (e.g., ports or mirrors). Such translational and rotational movement of the mirror surface 202 is effected by multiple, in this case three, actuators 204. The ability to raise and lower the mirror surface 202 in addition to tilting the surface 202 allows for a potentially greater range of tilt and commensurate flexibility in switch design. Control signals for driving of the actuators are transmitted via circuitry 206. All of the illustrated components may be fabricated on a substrate 208 using semi-conductor fabrication processes to form the unit 200 as a MEMS device.

Figure 3:
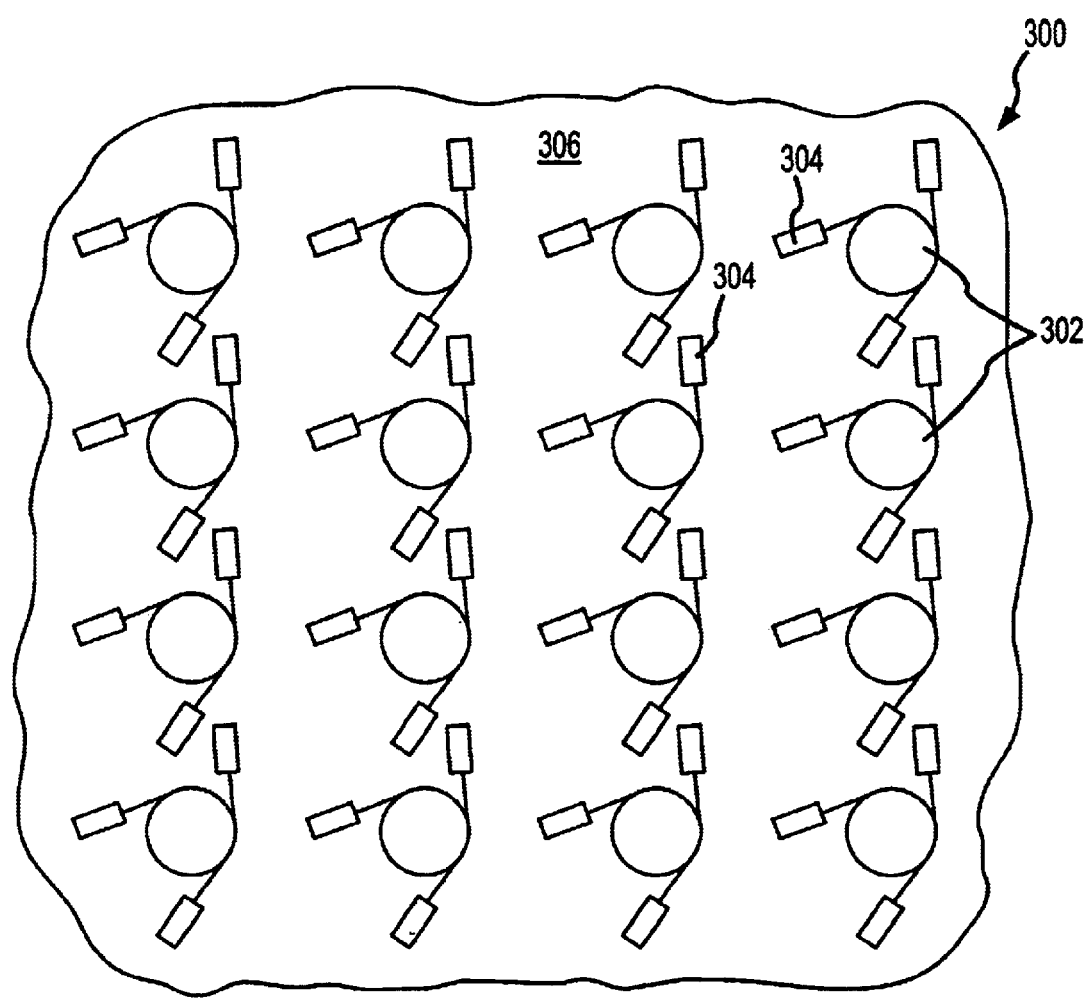
FIG. 3 is a top plan view of a portion of a mirror array in accordance with the present invention.

FIG. 3 is a top view of a portion of a mirror array 300 in accordance with present invention. The array 300 includes a number of mirrors 302 and associated actuators 304 formed on a substrate 306. Each of the mirrors 302 and its associated actuators 304 may be of a construction as described in connection with FIG. 2 above. As shown, the mirrors 302 can be densely packed on the substrate 306 in a substantially planar array. Other configurations of the mirror array are possible.

FIGS. 4–8 show various configurations of beam directing units. Although various elements of an OXC as shown in FIG. 1 are not shown in FIGS. 4–8. it will be appreciated that any of the beam directing units of FIGS. 4–8 may be incorporated into an OXC switch as shown in FIG. 1 with appropriate modifications. Also, although side elevations are depicted in FIGS. 4–8 for purposes of clarity, it will be appreciated that the arrays of FIGS. 4–8 may be two dimensional arrays as shown in FIG. 1 or other configurations.

Figure 4:
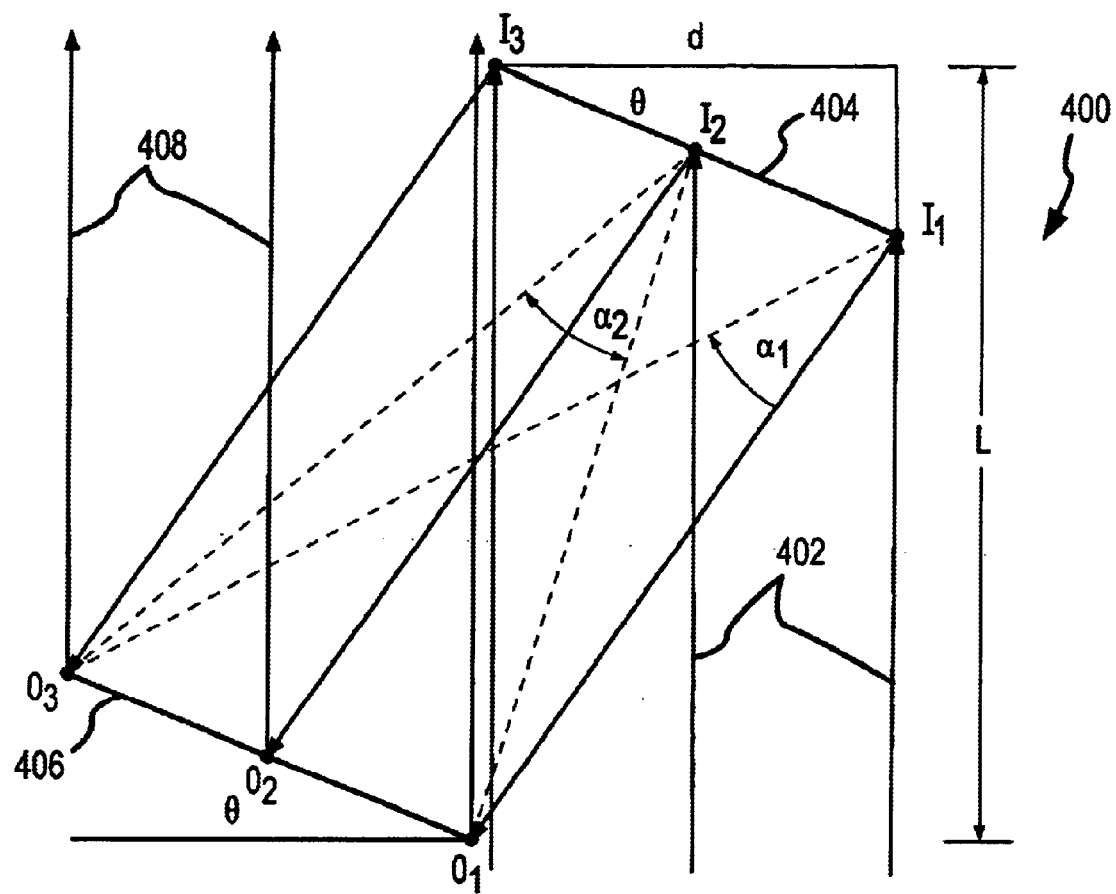
FIG. 4 is a schematic diagram of a beam directing unit in accordance with the present invention.

FIG. 4 illustrates a beam directing unit 400 in accordance with one possible switch geometry. The illustrated unit 400 includes an input mirror array 404 and an output mirror array 406. Input beams 402 are reflected by mirrors of the input array 404 to mirrors of the output array 406 resulting in output beams 408. The positions of three input and three output mirrors are shown although the arrays 404 and 406 may, and generally will, have a larger number of mirrors. Specifically, the position of the three input mirrors are generally identified by $I_1$, $I_2$ and $I_3$. These correspond to the rightmost mirror, a center mirror and the leftmost mirror respectively of the input array 404. The positions of the three output mirrors are generally identified by $O_1$, $O_2$ and $O_3$. These correspond to the rightmost mirror, a center mirror and the leftmost mirror respectively of the output array 406. $\alpha_1$ shows the angular translation or reflection angle range required for mirror $I_1$ to reflect an incoming beam 402 to any of the output mirrors. This range is subtended by the rays connecting $I_1$ to $O_1$ and $O_3$ respectively. Similarly, $\alpha_2$ shows the required reflection angle range for mirror $I_2$ to reflect an incoming beam for 402 to any of the output mirrors.

Figure 9:
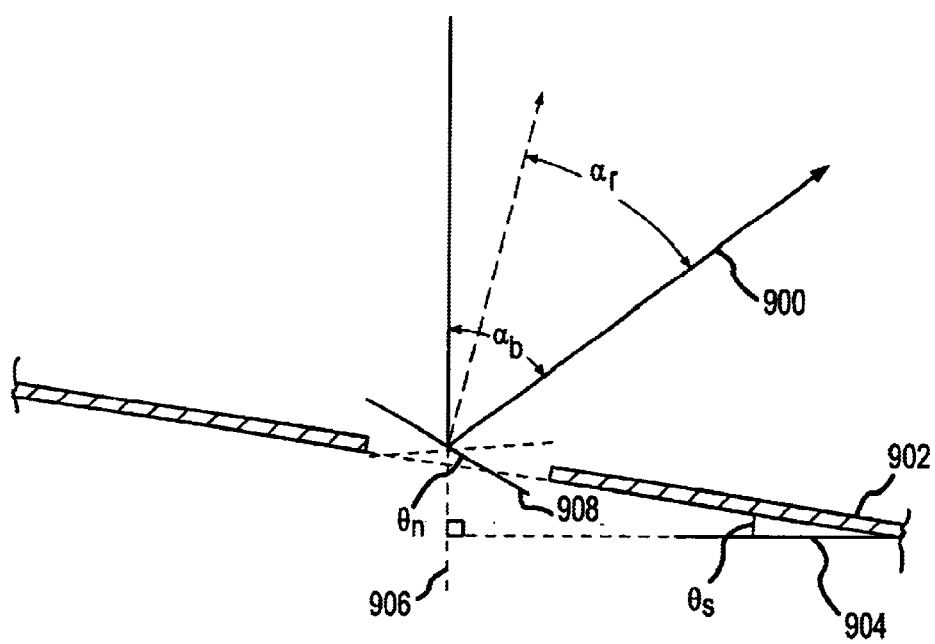
FIG. 9 illustrates the geometry of a mirror and mirror support structure in accordance with the present invention.

It will be appreciated that the angle through which a beam is reflected depends on the angular orientation of the array support structure relative to the incoming beam and the angular orientation, or tilt angle, of the mirror relative to the support structure. This is shown in FIG. 9, where the reflected beam is indicated at 900. The reflection angle of the beam is identified as the angle $\alpha_b$ and the total reflection range required to address all targets (e.g., mirrors of a second array, output fibers. other ports, etc.) is identified as $\alpha^r$. The reflection angle $\alpha_b$ in the illustrate example depends on: 1)the angular orientation of the support structure 902 (such as the substrate of a mirror device) in this case identified by $\theta_s$ relative to a line 904 orthogonal to the upcoming beam pathway 906; and 2) the angular orientation or tilt angle $\theta_m$ the mirror 908 relative to the support structure 902. Although the mirror surface is illustrated as being unelevated relative to the support structure 902, it will be understood that certain actuators used in accordance with the present invention allow for elevation as well as tilting of the mirror 908. In addition, although FIG. 9 provides a front view and therefore illustrates only one dimension of the angular relationships described above, it will be appreciated that the same relationships apply with respect to other dimensions, e.g., corresponding to a side view, in the case of multi-dimensional systems like N×N or other mirror arrays.

The mirror 908 will generally have a reference orientation, i.e., a value of $\theta_m = \theta_{mref}$ for a reference condition such as application of an initial mode voltage to the actuators associated with the mirror 908. For example, the initial mode voltage may be a common mode voltage for applications where the default mirror tilt angles are associated with one, common voltage. As will be discussed in more detail below, this angle $\theta_{mref}$ and the reference condition such as the initial mode voltage need not be the same for each mirror of an array or each actuator.

Referring again to FIG. 4, each of the mirrors $I_1$–$I_3$ and $O_1$–$O_3$ is an untilted position ($\theta_{mref} = 0°$). Accordingly, the required range of the tilt angle ($\theta_1$) of mirror $I_1$ to target all of the mirrors of array 406 is achieved by tilting mirror $I_1$ in one angular sense through the range $0 \leq \theta_1 \leq \frac{1}{2}\alpha_1$. By contrast the required range of the title angle $\theta_2$ of mirror $I_2$ is achieved by tilting mirror $I_2$ in two angular senses through the range $-\frac{1}{4}\alpha_2 \leq \frac{1}{4}\alpha_2$.

From these two examples it is readily observed that the various mirrors of array 404 will require significantly different tilt values to target the mirrors of array 406. This means that significantly different control movements (and generally control signals) will be required for the various mirrors of array 404 to target a given mirror of array 406. Moreover, the absolute value of the maximum tilt angle required by mirrors at an array extremity (e.g., for mirror $I_1$ to target the opposite extremity $O_3$) will be greater than that of centrally located mirrors. For certain MEMS mirror designs, the maximum tilt angle that can be achieved, e.g., before the mirror edge "bottoms out" on the substrate, is quite limited. Accordingly, in the illustrated embodiment, mirror control is complicated by the unique switching geometry of each mirror, and the switch size (number of possible connections) is subject to the unique limitations of mirrors at the array extremities for a given mirror spacing and overall switch geometry.

Figure 5:
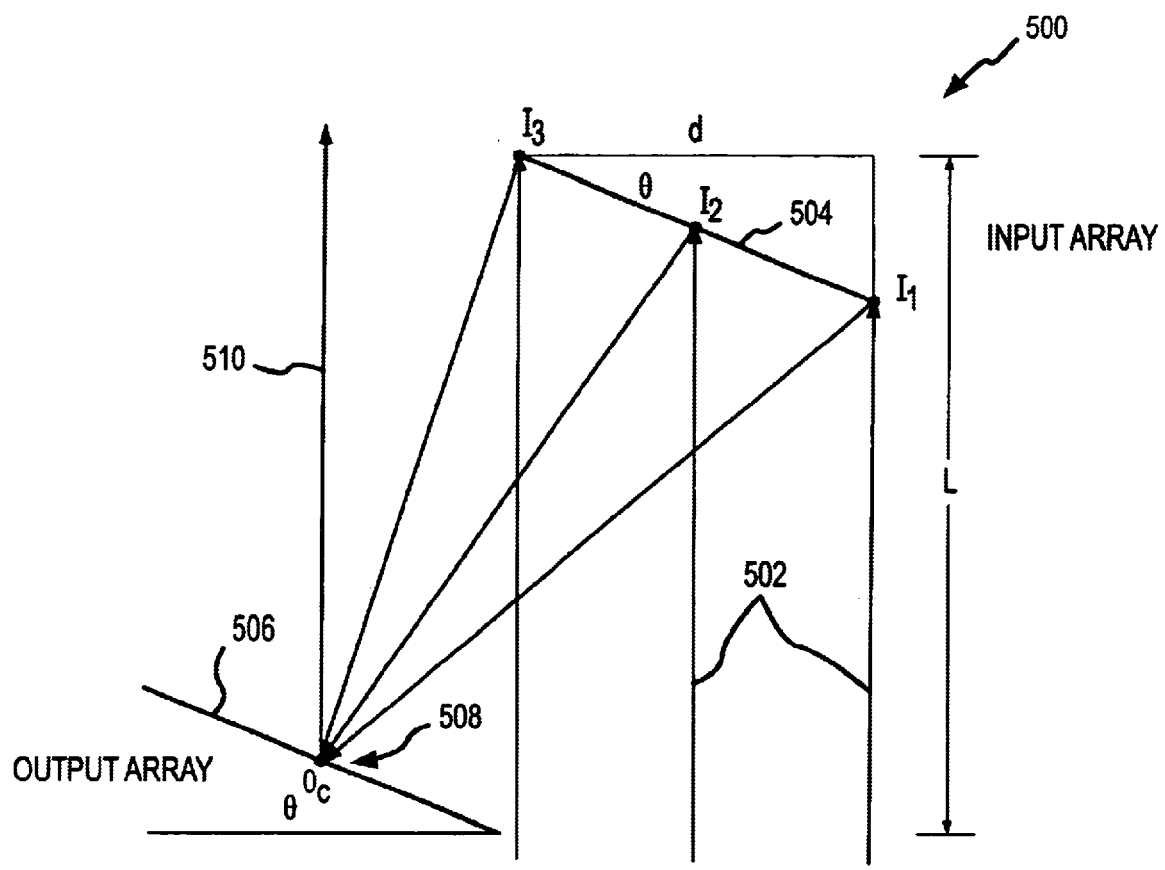
FIG. 5 is a schematic diagram of an alternative beam directing unit in accordance with present invention.

FIG. 5 shows an alternative reference configuration for a beam directing unit 500. In this case, each of the mirrors $I_1$–$I_3$ of input array 504 reflects an incoming beam 502 to the same (preferably centrally located) location relative to array 506, in this case, associated with center mirror $O_c$, under a reference condition. This may be accomplished in various ways. First, the substrate portion associated with each mirror $I_1$, $I_2$, $I_3$ may be oriented such that the untilted mirror ($\theta_{mref} = 0°$) reflects the incoming beam to mirror $O_c$. Second, the incidence angles of the incoming beams 502 may be varied such that each of the mirrors $I_1$, $I_2$, and $I_3$, when untilted, reflects a respective one of the beams 502 to mirror $O_c$. In this regard, the angular orientation of the transmitting ports may be varied or an array of fixed or movable mirrors may be used to redirect the incoming beams 502 between the transmitting port and the input array 504. Third, the actuators associated with each mirror may be configured and programmed to attain a unique reference tilt angle $\theta_{mref}$ in response to a common, initial mode voltage. Fourth, different initial mode voltages may be defined for the actuators associated with each mirror so as to drive each of the mirrors to a unique reference tilt angle $\theta_{mref}$. The latter two possibilities are particularly apt in connection with MEMS mirror designs that elevate and tilt and that are capable of large tilt angles as described in the above-noted co-pending application incorporated herein. Any other means for effecting the illustrated reference switching geometry may be employed in accordance with the present invention. As shown, in the reference condition, all of the incident beams can be reflected by mirror $O_c$ along a common output pathway 510.

Although all of the beams are shown as being directed to a central mirror $O_c$ under a reference condition, it will be appreciated that a different location may be selected as the common reference. Referring again to FIG. 1, the switch 100 may be configured so that beams from port structure 102 are reflected by the first mirrors 122 to a common reference location relative to array structure 106. The reference location may be, for example, the centerpoint C or another location that is not necessarily associated with any of the second mirrors 126. However, it may be desired to select a reference position associated with one of the mirrors 126, for example, so that beams are transmitted to the port structure 128 under reference conditions for testing purposes or to verify default alignment. For the reasons noted above, it is preferable to select a mirror for this reference location function that is not a peripheral mirror, i.e., a mirror within central area 125 of FIG. 1. It will generally be preferable to select a mirror proximate to centerpoint C in this regard.

In the previously described embodiments of the present invention, the pitch of the port array has generally been equal to the pitch of the associated movable mirror array. Such geometry allows for direct axial alignment of each movable mirror with its associated optical fiber/port in switches where the various ports of each port array are arranged to transmit and receive parallel beams. In accordance with the present invention, the port array pitch and the mirror array pitch can be different. This is useful for a number of reasons. First, other elements of the switch design may require a particular dimension for one of the arrays. By allowing the pitches to differ, the other array may be reduced in size to thereby potentially reduce the overall footprint of the switch. In addition, decoupling of the port array pitch and the mirror array pitch may allow a given mirror array design (or port array design) to be compatible with multiple different port array designs (or mirror array designs). In particular, because designing a mirror array and tooling for fabricating the mirror array can be time-consuming and expensive, it would be desirable to be able to reuse a particular mirror array design in multiple switch environments.

Figure 6:
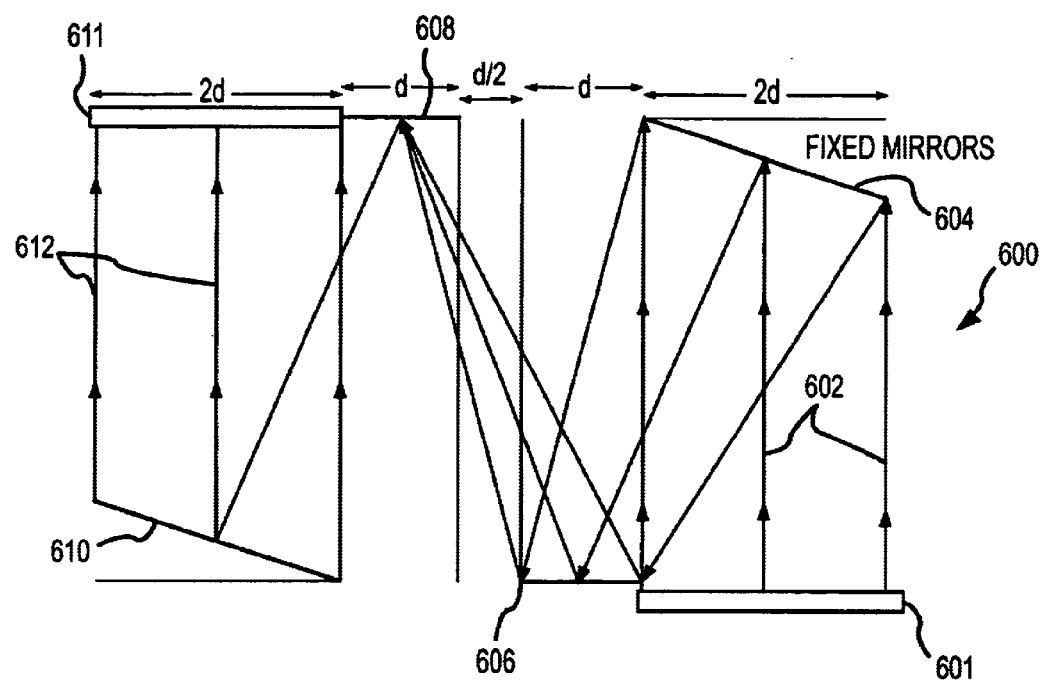
FIG. 6 is a schematic diagram of a beam directing unit with pitch translation elements in accordance with present invention.

FIG. 6 illustrates a beam directing unit 600 of a switch where the movable mirror array pitch is decoupled from the port pitch. The illustrated unit 600 includes an input port array, generally identifying by box 601, an input fixed mirror or mirrors 604, an input movable mirror array 606, an output movable mirror array 608, an output fixed mirror or mirrors 610 and an output port array, generally identified as box 611. Input beams 602 from the input port array 601 are reflected by the input fixed mirrors 604 to the input movable mirror array 606. The mirrors of input movable mirror array 606 reflect the beams to the output movable mirror array 608. The beams are then reflected by the mirrors 608 to the output fixed mirrors 610 and then to the output port array 611. In the illustrated embodiment, the input beams 602 are parallelly transmitted from the input port array 601 and the output beams 612 are parallelly received at the output port array 611.

A number of preferred geometric features are illustrated in FIG. 6. First, the pitch of the input port array 601 is different from the pitch of the input mirror array 606. This is achieved by allowing the input beams 602 to diverge or converge relative to one another over at least a portion of the pathway between the input port structure 601 and the input mirror array structure 606. Such divergence or convergence can be implemented in various ways. For example, the input fibers may be mounted such that their ends have varying angular orientations so as to transmit converging or diverging beams. Alternatively or additionally, optics, such as mirrors, lenses, prisms or the like, may be interposed in the optical paths of the input beams between port structure 601 and the mirror array structure 606 to change the rate of convergence or divergence (rate of change of separation with respect to path position) of the beams, e.g., from zero to a non-zero value. In the illustrated embodiment, the pitch of the input mirror array 606, having a lateral extent d, is one-half of the pitch of the input port array 601, having a lateral extent 2d. Similarly, the pitch of the output mirror array 608,d, is one-half of the pitch of the output port array 611,2d. Thus, the input fixed mirrors 604 serve to demagnify the pitch of the incoming beams 602 and the output fixed mirrors 610 serve to magnify the pitch of the output beams 612. In particular, it is readily observed that the fixed mirrors 604 change the rate of change of separation between the input beams 602. In this regard, the beams 602 transmitted from input port structure 601 are substantially parallel whereas the beams 602 incident on the input mirror array structure 606 are converging. The various fixed mirrors 604 thus effect different reflection angles. It will be appreciated that this may be accomplished by using an array of fixed (or movable) mirrors as shown, a single non-planar (e.g. concave) mirror, or other means.

FIG. 6 also illustrates the reference orientation of the various mirrors of the input mirror array 606. As shown, in the reference orientation, each of the mirrors of array 606 directs input beams to a common centerpoint of output array 608. In the case of bidirectional communication, each of the mirrors of array 608 may direct incident beams at common centerpoint of mirror array 606. As noted above, the incoming beams incident on mirror array 606 are not parallel but define a converging cross-section. This assists in establishing a common reference orientation for the mirrors of the input array 606. In particular, where the mirrors of array 606 are formed on a common planar substrate, the required differences in the reference tilt angles of the various mirrors of the illustrated embodiment are reduced in relation to the case of parallel incoming beams. Also, in the illustrated embodiment, the input port pitch is equal to the output port pitch and the input array pitch is equal to the output array pitch. Although this relationship is not necessary, it allows for convenient duplication of certain elements of the port array design and mirror array design.

Figure 8:
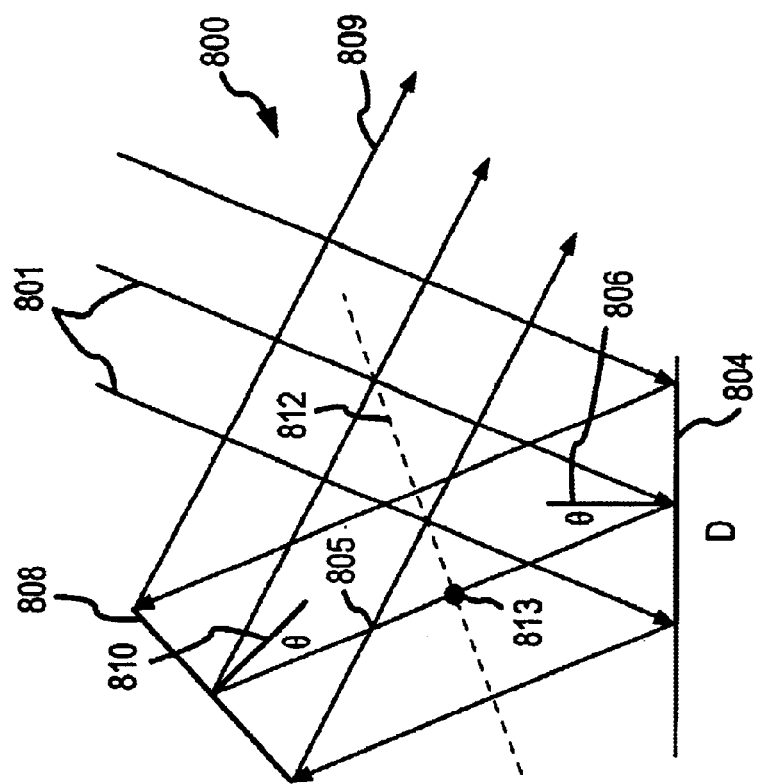
FIG. 8 is a schematic diagram of a beam directing unit with a reflectional symmetry geometry in accordance with the present invention.
Figure 7:
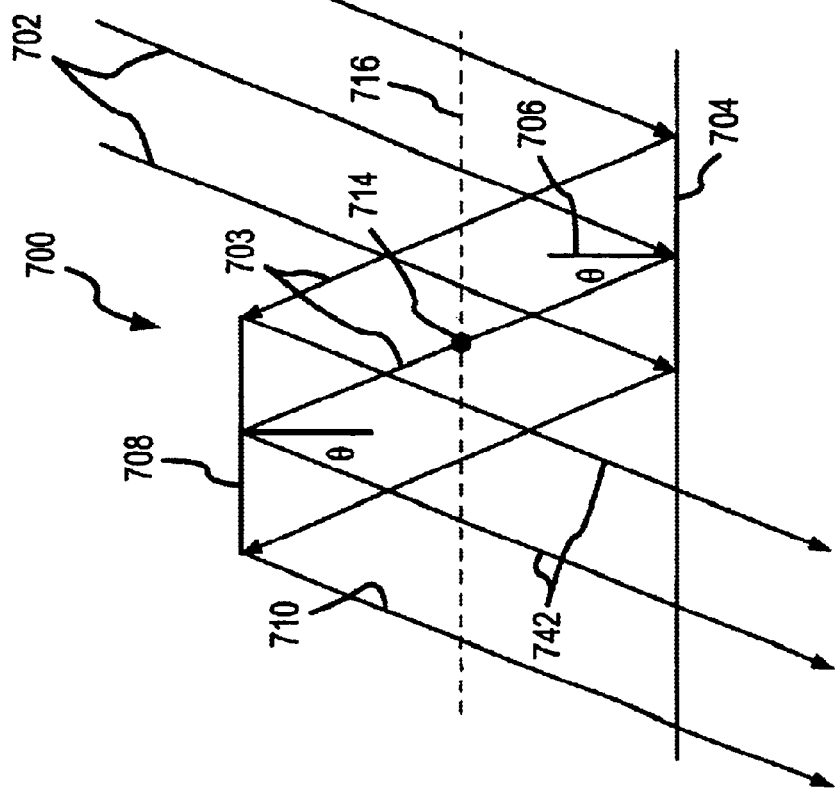
FIG. 7 is a schematic diagram of a beam directing unit with a rotational symmetry geometry in accordance with present invention.

FIGS. 7 and 8 illustrate two different types of symmetry for preferred switch designs. In particular, FIG. 7 illustrates rotational symmetry and FIG. 8 illustrates reflectional symmetry. Referring first to FIG. 7, the illustrated beam directing unit 700 includes an input mirror array 704 and an output mirror array 708. Input beams 702 are reflected by mirror array 704 to mirror array 708. The resulting output beams are identified by reference numeral 712. It has been recognized that certain geometric arrangements facilitate improved optical efficiency in an OXC switch. In particular, when an optical beam ("input beam") having a circular cross-section is reflected by a mirror surface disposed at an oblique angle relative to the signal propagation axis of the input beam, the reflected beam will have an elliptical cross-section and a reduced optical density. The circular cross-section of the beam and the original optical density can be substantially restored by again reflecting the reflected beam using a second mirror surface where the second mirror surface is disposed at an oblique angle relative to the reflected beam of the same magnitude as, but opposite in sign to, the oblique angle of the first mirror relative to the input beam. Moreover, in order to effect such a relationship using similar tilt angles for the first and second mirrors, a similar geometry may be employed with respect to the mirror array support structures or substrates.

One implementation of this geometry is illustrated in FIG. 7. In particular, the first array 704 is disposed at a first angular orientation relative to input beams 702. This orientation is generally indicated by the angle e between the path of the input beams 702 and a normal line 706 to the first array 704. It will be appreciated that the same angle is subtended by the normal line 706 and the path of reflected beams 703. Furthermore, the same angle is subtended by the path of the reflected beams 703 and normal line 710 of second mirror array 708, as well as by normal line 710 and the path of output beams 712. It will be observed that the illustrated unit 700 is symmetrical relative to a 180 degree rotation about point 714 which is the centerpoint of the pathway of a center reflected beam 703 between the arrays 704 and 708. Differently stated, the optical pathway of the input beams 702 and the reflected beams 703 up to the intersection of the reflected beams 703 with line 716 is the mirror image of to the optical pathway of the reflected beams 703 after crossing line 716 and the output beams 712, where line 716 is parallel to each of the arrays 704 and 708 and is equidistant from the arrays 704 and 708 relative to the pathway of the reflected beams 703.

Another implementation of this geometry is illustrated in FIG. 8. The unit 800 of FIG. 8 includes a first mirror array 804 and a second mirror array 808. Input beams 802 are reflected by the mirrors of array 804. The resulting reflected beams 805 are reflected by the mirrors of the second array 808. The output beams are generally identified by the reference numeral 809. As shown, the angular orientation of the first array 804 is generally indicated by the angle e subtended by the path of the input beams 802 and the normal line 806 to array 804. The same angle is subtended by the path of the reflected beams 805 and the normal line 810 of the second array 808. It will thus be observed that the illustrated unit 800 is symmetrical with respect to line 812 which is orthogonal to the paths of the reflected beams 805 and extends through the centerpoint 813 of those paths between the first array 804 and second array 808. Again, for input beams 802 having a substantially circular cross-section, the resulting output beams 809 for this geometry (assuming a symmetrical relationship of the tilt angles of the mirrors of mirror arrays 804 and 808) will have a substantially circular cross-section. In this manner, the optical density of the output beams 809 is enhanced as is insertion of the output optical beams 809 into an output fiber.

Figure 10:
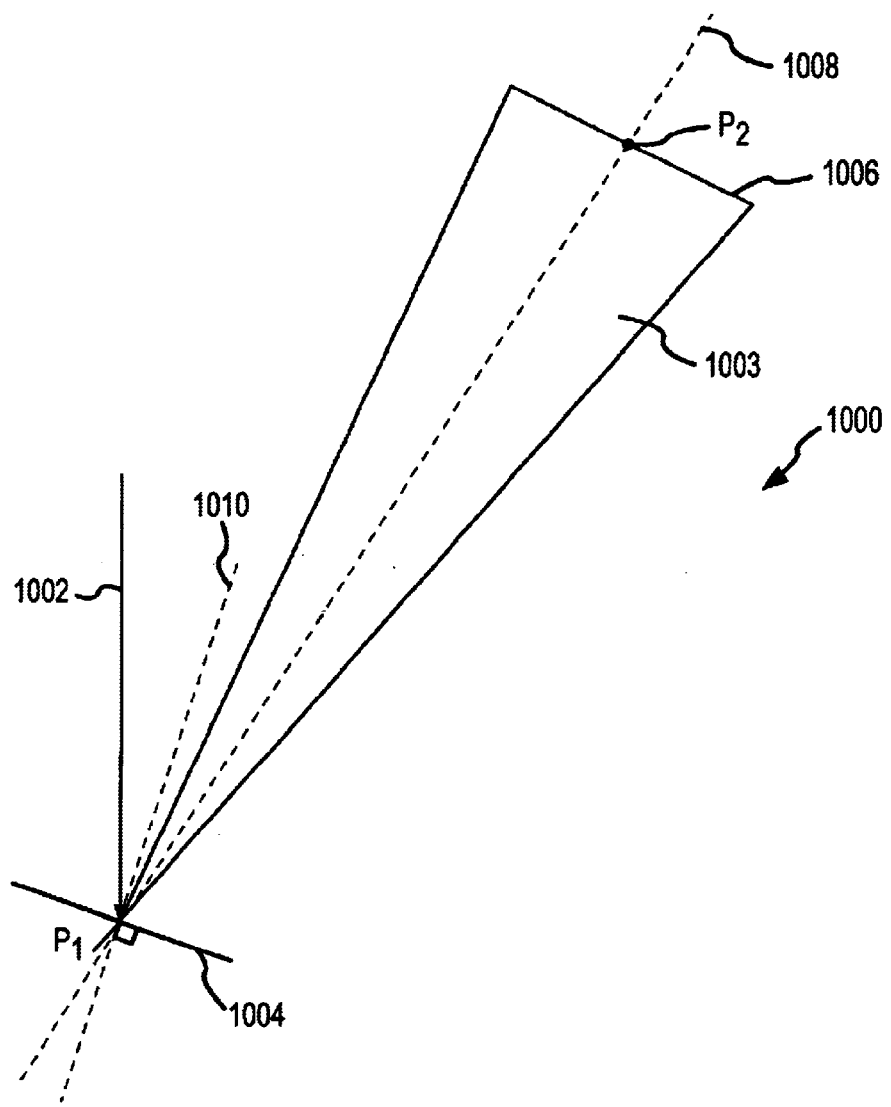
FIG. 10 illustrates the geometry of a mirror support structure and target array in accordance with the present invention.

FIG. 10 illustrates another parameter relating to certain preferred angular orientations of the mirror array or arrays of an OXC switch. The illustrated beam directing unit 1000 includes at least one mirror array 1004. The array 1004 includes at least one mirror (indicated by point $P_1$) that can reflect an incoming beam 1002 across a range of reflection angles (indicated by cone 1003) to targets on support structure 1006. The targets may be, for example, an array of mirrors or an array of output ports. The range of reflection angles 1003 has a center axis 1008. The illustrated mirror array 1004 is oriented such that the normal line 1010 of array 1004 extending through point P₁ falls between the pathway of the incoming beam 1002 and the center axis 1008 and, more preferably, such that normal line 1010 substantially bisects the angle subtended by the path of incoming beam 1002 and center axis 1008. Such a geometry reduces the maximum required tilt angle of mirrors of array 1004 to direct incoming beams 1002 across range 1003 and further reduces the maximum reference tilt angle of mirrors of array 1004 centerpoint P₂ to target of structure 1006.

While various embodiments of the present invention have been described in detail, further modifications and adaptations of the invention may occur to those skilled in the art. However, it is to be expressly understood that such modifications and adaptations are within the spirit and scope of the present invention.

What is claimed:

1. An optical switch for optically connecting any of multiple first ports to any of multiple second ports, comprising:
   a first array of first movable mirrors;
   a second array of targets, wherein an optical beam is transmitted between a selected first port and a selected one of said targets via one of said first movable mirrors;
   said first array of movable mirrors being operative such that each of said first movable mirrors directs an incident optical beam to substantially the same location relative to said second array under a reference condition, said first movable mirrors including a first mirror and a second mirror, where said first and second mirrors are disposed at different angular orientations, relative to optical beams incident on the respective first and second mirrors, under said reference condition.

2. An optical switch as set forth in claim 1, wherein said first array is a two-dimensional array where the first movable mirrors are distributed from side to side and top to bottom relative to an array support structure.

3. An optical switch as set forth in claim 1, wherein said first movable mirrors of said first array are disposed on a common substrate.

4. An optical switch as set forth in claim 1, wherein said first movable mirrors of said first array include a MEMS device.

5. An optical switch as set forth in claim 1, wherein said first movable mirrors of said first array are disposed on an array support structure and at least one of said first movable mirrors is adapted for translation and rotation, said translation involving movement of said mirror away from said array support structure and said rotation involving angular movement of said mirror relative to said array support structure.

6. An optical switch as set forth in claim 1, wherein said first array includes an array support structure where said first movable mirrors are disposed on an upper surface of said support structure and said upper surface is disposed at an oblique angle relative to a center axis or input beams transmitted between said first ports and said first array.

7. An optical switch as set forth in claim 6, wherein a normal line extending perpendicularly to said upper surface through a point of intersection of said center axis with said upper surface falls between said center axis and a line connecting said point of intersection and a centerpoint of said second array.

8. An optical switch as set forth in claim 7, wherein said normal line substantially bisects an angle subtended by said center axis and said line.

9. An optical switch as set forth in claim 1, wherein said targets comprise a number of second movable mirrors arranged such that said optical beam is transmitted between said selected first port and a selected second port via said one of said first movable mirrors and one of said second movable mirrors.

10. An optical switch as set forth in claim 1, wherein each of said first movable mirrors directs said incident optical beam to substantially a centerpoint of said second array under said reference condition.

11. An optical switch as set forth in claim 1, wherein said targets comprise a number of second movable mirrors including peripheral mirrors and central mirrors where said peripheral mirrors are disposed adjacent edges of said second array and said central mirrors are disposed interior of said peripheral mirrors relative to said second array and each of said first movable minors directs an incident optical beam to a common one of said central mirrors under said reference condition.

12. An optical switch as set forth in claim 11, wherein said common one of said central mirrors comprises a center mirror where said center mirror is at least as close to a centerpoint of said second array as any other one of said central mirrors.

13. An optical switch as set forth in claim 1, wherein said first ports are disposed in a port array having a port pitch and said first array has an array pitch, and said port pitch is different than said array pitch, said port pitch being a cross-sectional port array area relative to a first plane adjacent to the port array and orthogonal to a first center axis of first beams transmitted relative to the port array, and said array pitch being a cross-sectional array area relative to a second plane adjacent to the first array and orthogonal to a second center axis of second beam transmitted relative to the first array.

14. An optical switch as set forth in claim 13, wherein said port pitch is greater than said array pitch.

15. An optical switch as set forth in claim 1, further comprising means, disposed between the first ports and the first array, for changing the rate of separation with respect to path position of beams transmitted between various ones of the first ports and the first array.

16. An optical switch as set forth in claim 15, wherein said means for changing changes the rate of separation between a first value and a second value where one of said first and second values is zero.

17. An optical switch as set forth in claim 15, wherein said means for changing comprises reflective means for reflecting said beams between said first ports and said first array.

18. An optical switch as set forth in claim 1, wherein said second array comprises a number of second movable mirrors, said switch further including at least one axis of symmetry such that an optical pathway across a portion of the switch interface between the first ports and a second ports including the first array and the second array is symmetrical about the symmetry axis when projected onto a plane including the symmetry axis.

19. An optical switch as set forth in claim 1, wherein said second array comprises a number of second movable mirrors, said switch further including at least one axis of symmetry such that an optical pathway across a portion of the switch interface between the first ports and second ports including the first array and the second array is the same, as projected onto a plane orthogonal to the symmetry axis, when rotated 180 degrees about the symmetry axis.

20. An optical switch for optically connecting any of multiple first ports to any of multiple second ports, comprising:
   a first array of first movable mirrors;

a second array of second movable mirrors, wherein an optical beam is transmitted between a selected one of said first ports and a selected one of said second ports via one of said first movable mirrors and one of said second movable mirrors;

said first array of first movable mirrors being operative such that each of said first movable mirrors requires substantially the same range of movement to direct incident optical beams to any one of the second movable mirrors.

21. An optical switch as set forth in claim 20, wherein said first array is a two-dimensional array where the first movable mirrors are distributed from side to side and top to bottom relative to an array support structure.

22. An optical switch as set forth in claim 20, wherein said first movable mirrors of said first array include a MEMS device.

23. An optical switch as set forth in claim 20, wherein said first movable mirrors of said first array are disposed on an array support structure and at least one of said first movable mirrors is adapted for translation and rotation, said translation involving movement of said mirror away from said array support structure and said rotation involving angular movement of said minor relative to said array support structure.

24. An optical switch as set forth in claim 20, wherein said first array includes an array support structure where said first movable mirrors are disposed on an upper surface of said support structure and said upper surface is disposed at an oblique angle relative to a center axis of input beams transmitted between said first ports and said first array.

25. An optical switch as set forth in claim 24, wherein a normal line extending perpendicularly to said upper surface through a point of intersection of said center axis with said upper surface falls between said center axis and a line connecting said point of intersection and a centerpoint of said second array.

26. An optical switch as set forth in claim 25, wherein said normal line substantially bisects an angle subtended by said center axis and said line.

27. An optical switch as set forth in claim 20, wherein each of said first movable mirrors directs said incident optical beam to substantially a centerpoint of said second array under a reference condition.

28. An optical switch as set forth in claim 20, wherein said second movable mirrors include peripheral mirrors and central mirrors where said peripheral mirrors are disposed adjacent edges of said second array and said central mirrors are disposed interior of said peripheral mirrors relative to said second array and each of said first movable mirrors directs an incident optical beam to a common one of said central mirrors under a reference condition.

29. An optical switch as set forth in claim 28, wherein said common one of said central mirrors comprises a center mirror where said center mirror is at least as close to a centerpoint of said second array as any other one of said central mirrors.

30. An optical switch as set forth in claim 20, wherein said first ports are disposed in a port array having a port pitch and said first array has an array pitch, and said port pitch is different than said array pitch, said port pitch being a cross-sectional port array area relative to a first plane adjacent to the port array and orthogonal to a first center axis of first beams transmitted relative to the port array, and said array pitch being a cross-sectional array area relative to a second plane adjacent to the first array and orthogonal to a second center axis of second beam transmitted relative to the first array.

31. An optical switch as set forth in claim 30, wherein said port pitch is greater than said array pitch.

32. An optical switch as set forth in claim 20, further comprising means, disposed between the first ports and the first array, for changing the rate of separation with respect to path position of beams transmitted between various ones of the first ports and the first array.

33. An optical switch as set forth in claim 32, wherein said means for changing comprises reflective means for reflecting said beams between said first ports and said first array.

34. An optical switch as set forth in claim 32, wherein said means for changing changes the rate of separation between a first value and a second value where one of said first and second values is zero.

35. An optical switch as set forth in claim 20, wherein mirrors of at least one of said first array of first movable mirrors and said second array of second movable mirrors are disposed on a common substrate.

36. An optical switch for optically connecting any of multiple first ports to any of multiple second ports, comprising:

an array of first ports;

an array of first movable mirrors, wherein each one of said first movable mirrors is associated with a respective one of said first ports;

said array of first ports defining a cross-sectional port array area relative to a first plane transverse to a propagation axis of optical signals transmitted between said first ports and said first movable mirrors;

said array of first mirrors defining a cross-sectional mirror array area relative to a second plane transverse to said propagation axis of said optical signals transmitted between said first ports and said first mirrors;

said cross-sectional port array area being different than said cross-sectional mirror array area.

37. An optical switch as set forth in claim 36, wherein port array area is greater than said mirror array area.

38. An optical switch as set forth in claim 36, further comprising means, disposed between the first ports and the first mirrors, for changing the rate of separation with respect to path position of beams transmitted between various ones of the first ports and the first mirrors.

39. An optical switch as set forth in claim 38, wherein said means for changing changes the rate of separation between a first value and a second value where one of said first and second values is zero.

40. An optical switch as set forth in claim 38, wherein said means for changing comprises reflective means for reflecting said beams between said first ports and said first mirrors.

41. An optical switch for optically connecting any of multiple first ports to any of multiple second ports, comprising:

an array of first ports;

an array of first movable mirrors wherein each one of said first movable mirrors is associated with a respective one of said first ports;

said array of first ports defining a cross-sectional port array area relative to a first plane transverse to a propagation axis of optical signals transmitted between said first ports and said first mirrors;

said array of first mirrors having a mirror array area defined relative to the mirror array support structure;

said mirror array area being smaller than said cross-sectional port array area.

42. An optical switch as set forth in claim 41, further comprising means, disposed between the first ports and the first mirrors, for changing the rate of separation with respect to path position of beams transmitted between various ones of the first ports and the first mirrors.

43. An optical switch as set forth in claim 42, wherein said means for changing changes the rate of separation between a first value aid a second value where one of said first and second values is zero.

44. An optical switch as set forth in claim 42, wherein said means for changing comprises reflective means for reflecting said beams between said first ports and said first array.

45. An optical switch for optically connecting any of multiple first ports to any of multiple second ports, comprising:
   an array of said first ports;
   an array of first movable mirrors wherein each one of said first movable mirrors is associated with a respective one of said first ports;
   an array of second ports;
   an array of second movable mirrors wherein each one of said second movable mirrors is associated with a respective one of said second ports;
   reflective means located in at least one of the following positions a) and b);
      a) optically interposed between said array of first ports and said array of first movable mirrors; and
      b) optically interposed between said array of second ports and said array of second movable mirrors,
   wherein said array of first ports has a port array having a port pitch and said array of first movable mirrors has an array pitch, and said port pitch is different than said array pitch, said port pitch being a cross-sectional port array area relative to a first plane adjacent to the array of first ports and orthogonal to a first center axis of first beams transmitted relative to the array of first ports, and said array pitch being a cross-sectional array area relative to a second plane adjacent to the array of first movable mirrors and orthogonal to a second center axis of second beams transmitted relative to the array of first movable mirrors.

46. An optical switch as set forth in claim 45, wherein said reflective means comprises a single mirror optically associated with multiple parts.

47. An optical switch as set forth in claim 45, wherein said reflective means comprises multiple mirrors where each one of said multiple mirrors is associated with one port and one of said movable mirrors.

48. An optical switch as set forth in claim 45, wherein said port pitch is greater than said array pitch.

49. A method for use in configuring an optical switch for optically connecting any of multiple input ports to any of multiple output ports, comprising the steps of:
   providing a first array of first movable mirrors on a first support structure;
   providing a second array of second movable mirrors on a second support structure, wherein a given one of said first movable mirrors receives an optical beam transmitted along a first input axis and a given one of said second movable mirrors reflects said optical beam along a second output axis;
   for a given switch geometry relative to orientations of the first and second axes and relative to the separation distance between respective ones of the second movable mirrors and between the first and second arrays, establishing an angular orientation of said first support structure relative to said first axis so as to minimize the maximum tilt angle required by said given one of said first mirrors to connect an input port associated with said given one of said first mirrors to said given one of said output ports, wherein said first movable mirrors are disposed on an upper surface of said first support structure and said upper surface is disposed at an oblique angle relative to a center axis of input beams transmitted between said input ports and said first array and a normal line extending perpendicularly to said upper surface through a point of intersection of said center axis with said upper surface falls between said center axis and a line connecting said point of intersection and a centerpoint of said second array.

50. A method as set forth in claim 49, wherein said given one of said first movable mirrors is disposed at a first extremity of said first array and said given one of said second movable minors is disposed at a second extremity of said second array opposite said first extremity.

51. A method as set forth in claim 49, wherein at least one of said first movable mirrors is adapted for translation and rotation, said translation involving movement of said mirror away from said first array support structure and said rotation involving angular movement of said mirror relative to said array first support structure.

52. A method as set forth in claim 49, wherein said normal line substantially bisects an angle subtended by said center axis and said line.

53. A method as set forth in claim 49, wherein each of said first movable mirrors directs an input beam to substantially a centerpoint of said second array under a reference condition.

54. A method as set forth in claim 49, wherein said second movable mirrors include peripheral mirrors and central mirrors where said peripheral mirrors are disposed adjacent edges of said second array and said central mirrors are disposed interior of said peripheral mirrors relative to said second array and each of said first movable mirrors directs an incident optical beam to a common one of said central mirrors under a reference condition.

55. A method as set forth in claim 54, wherein said common one of said central mirrors comprises a center mirror where said center mirror is at least as close to a centerpoint of said second array as any other one of said central mirrors.

56. An optical switch for optically connecting any of multiple first ports to any of multiple second ports, comprising:
   a first array of first movable mirrors on a first support structure;
   a second array of second movable mirrors on a second support structure;
   wherein a given one of said first movable mirrors receives an optical signal transmitted along a first input axis and a given one of said second movable mirrors reflects said optical signal along the a second output axis;
   said first and second axes and said first and second support structures having one of the following symmetries a) and b);
   a) rotational symmetry wherein said first and second axes and said first and second support structures are symmetrical relative to a 180 degree rotation about a first symmetry axis; and
   b) reflectional symmetry wherein said first and second axes and said first and second support structures are symmetrical about at least a second axis of symmetry, wherein the first support structure has a first centerpoint and the second support structure has a second centerpoint, and the first and second support structures are oriented such than:

i) a first angle is defined between a first line connecting the first and second centerpoints and a second line normal to an upper surface of the first support structure extending through the first centerpoint;

ii) a second angle is defined between the first line and a third line normal to an upper surface of the second support structure extending through the second centerpoint; and iii) the first angle is substantially the same as the second angle.

57. An optical switch for optically connecting any of multiple first ports to any of multiple second ports, comprising:

an array of first movable minors on a first support structure, said first array having a first centerpoint;

a second array of second movable mirror on a second support structure, said second array having a second centerpoint;

said first support structure being oriented to define a first angle between a first line connecting said first and second centerpoints and a second line extending through said first centerpoint normal to said first support structure;

said second support structure being oriented to define a second angle between said first line connecting said first and second centerpoints and a third line extending through said second centerpoint normal to said second support structure; and said first angle is substantially equal to said second angle.

58. An apparatus for use in connecting any of multiple first ports to any of multiple second ports, comprising:

a first array of first movable mirrors, each of said mirrors being movable from a reference orientation across a range of angular orientations for effecting connections between various pairings of said first and second ports, said reference orientation being associated with a common reference condition of said first array; and a controller for controlling movement of said first movable mirrors;

wherein said reference orientation for each one of said mirrors is dependent on the position of said one of said mirrors within said first array.

59. An apparatus as set forth in claim 58, further comprising a second array of second movable mirrors, said first movable mirrors and second movable mirrors for effecting said connections.

60. An apparatus as set forth in claim 59, wherein each of said first movable mirrors, when in said reference orientation, directs incoming signals to a common location relative to said second array.

* * * * *

UNITED STATES PATENT AND TRADEMARK OFFICE
CERTIFICATE OF CORRECTION

PATENT NO.   : 6,813,057 B2                                                                Page 1 of 1
DATED        : November 2, 2004
INVENTOR(S)  : Miller It is certified that error appears in the above-identified patent and that said Letters Patent is hereby corrected as shown below:

Column 14,
Line 15, delete "minors", and insert therefor -- mirrors --.

Column 15,
Line 23, delete "minor", and insert therefor -- mirror --;
Line 27, delete "arc", and insert therefor -- are --.

Column 17,
Line 6, delete "aid", and insert therefor -- and --.

Column 18,
Line 17, delete "minors", and insert therefor -- mirrors --.

Column 19,
Line 3, delete "than", and insert therefor -- that --;
Line 17, delete "minors", and insert therefor -- mirrors --;
Line 20, delete "mirror", and insert therefor -- mirrors --.

Signed and Sealed this

First Day of February, 2005

JON W. DUDAS
*Director of the United States Patent and Trademark Office*